July 7, 1964 B. N. ROBINSON 3,139,739
UPDRAFT CONTINUOUS FREEZER FOR COMESTIBLES
Filed Feb. 15, 1962 2 Sheets-Sheet 1
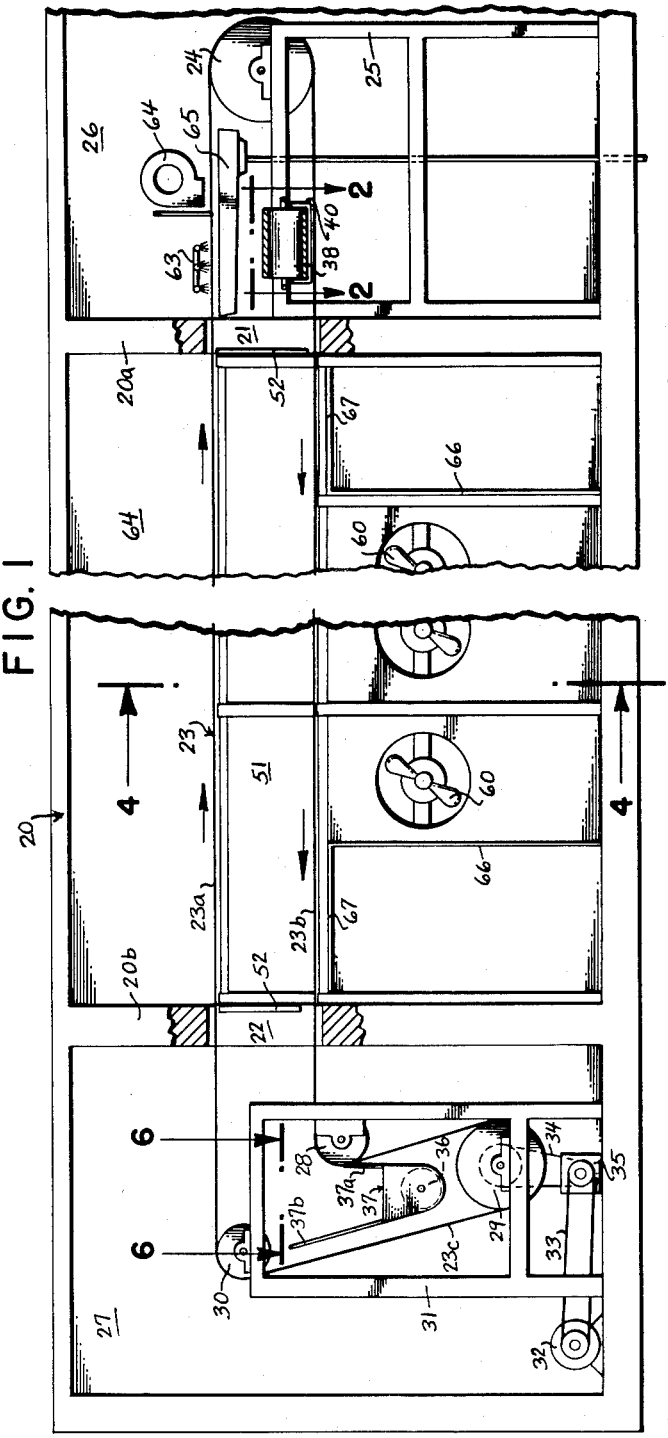
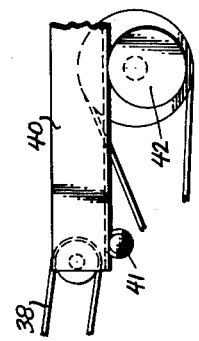
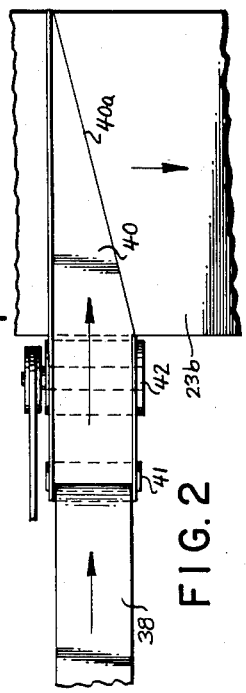
INVENTOR.
BERT N. ROBINSON
BY Barnes + Seed
ATTORNEYS

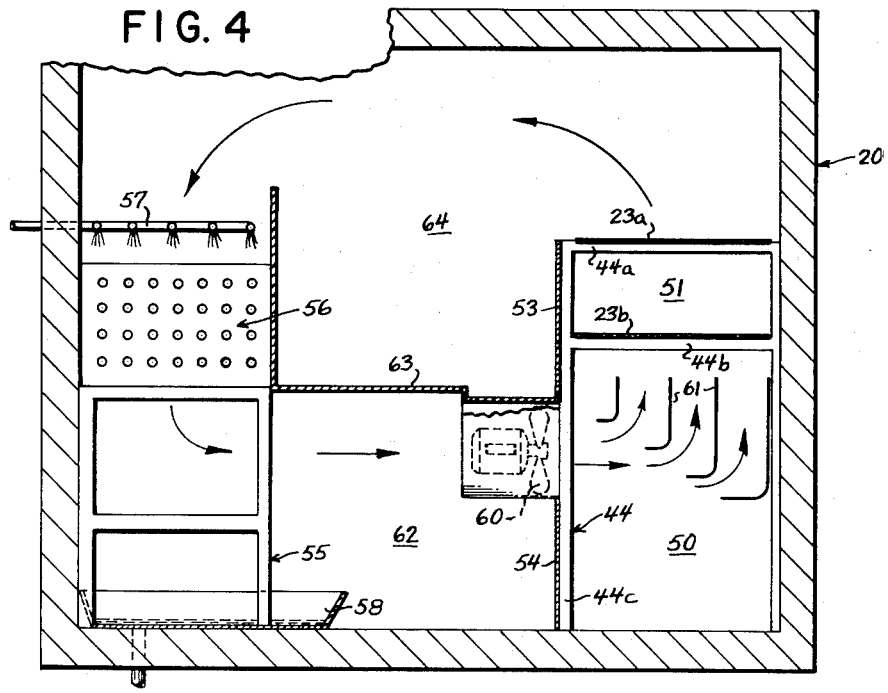
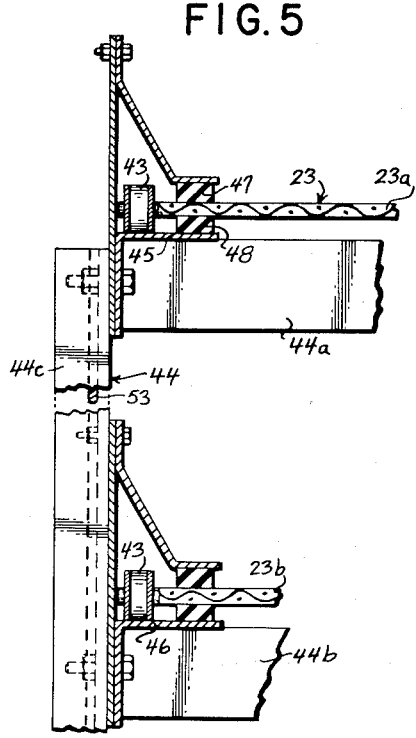
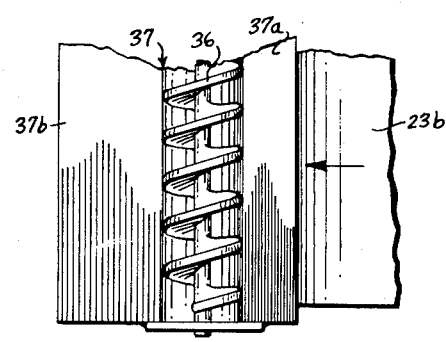

United States Patent Office 3,139,739
Patented July 7, 1964

3,139,739
UPDRAFT CONTINUOUS FREEZER FOR COMESTIBLES
Bert N. Robinson, Mercer Island, Wash., assignor to W. E. Stone & Co., Inc., Seattle, Wash., a corporation of Washington
Filed Feb. 15, 1962, Ser. No. 173,522
13 Claims. (Cl. 62—303)

The present invention relates to improved apparatus for quick freezing comestibles such as vegetables and fruits, especially peas, corn, lima beans, cut string beans, and berries, prior to packaging for storage and merchandising. More particularly, the invention is concerned with updraft continuous freezers i.e., freezing tunnels in which refrigerated air is circulated in a closed loop upwardly through comestibles while they are carried along on a perforated conveyor belt. Such updraft freezing systems have been found advantageous in that the comestibles are agitated by the refrigerated air current, thereby countering to a large extent the natural tendency of the comestible pieces to freeze to the conveyor belt and to one another. Another advantage has been greater efficiency from the air circulating fans as compared to downdraft systems.

However, updraft freezing arrangements have heretofore had the objection that the air current carried pieces and particles of the comestibles from the conveyor belt to air circulating fans or the air refrigerating coils on which they thereupon froze, and scattered them to other parts of the freezing tunnel. Accordingly, the present invention aims to provide an improved updraft freezer of unusually simple and economical construction which will eliminate these objections and decrease the frequency of shut-downs for defrosting and tunnel clean-up.

With the above and other more particular objects and advantages in view and which will appear and be understood in the course of the following description and claims, the invention consists in the novel construction and in the adaptation and combination of parts hereinafter described and claimed.

In the accompanying drawings:
FIG. 1 is an elevational diagrammatic view of a freezing tunnel embodying the present invention.
FIG. 2 is a detail plan view taken as indicated by line 2—2 of FIG. 1.
FIG. 3 is a fragmentary side elevational view of the feed conveyor and spreader.
FIG. 4 is a transverse vertical sectional view taken along the line 4—4 of FIG. 1.
FIG. 5 is a detail vertical transverse sectional view of the left hand portion of the freezing belt and supporting stand as viewed in FIG. 4; and
FIG. 6 is a detail plan view taken as indicated by line 6—6 of FIG. 1.

Referring to the drawings, 20 designates an insulated freezing tunnel having ingress and egress openings 21–22 in its head and foot walls 20a–20b, respectively, for the passage of the upper and lower courses 23a–23b of a conveyor taking the form of an endless perforated belt 23. At its head end the conveyor passes over a sprocket 24 which is journal mounted on a stand 25 in a loading compartment 26. From this sprocket the courses of the belt travel in parallel relation through the freezing tunnel into a discharge compartment 27 and there interconnect by a downwardly extending open loop portion 23c which is defined by three sprockets 28–30. These sprockets are journal mounted on a stand 31 with sprocket 28 at the foot of the lower course 23b, sprocket 29 at the elbow of the loop 23c, and sprocket 30 at the foot of the upper course 23a. An electric motor 32 drives the conveyor by driving the lower sprocket 29 via V-belts 33–34 and a gear reduction box 35.

It will be noted that the sprocket 29 partly underlies the sprocket 28 so as to cause the two runs of the loop portion 23c to slope downwardly toward the head of the belt, i.e. form acute angles with the upper and lower courses 23a–23b. The purpose of the loop 23c and its said slope is to permit the lower course 23b of the belt to have a gravity fall for product discharge and hence serve the product carrying office rather than the upper course as would be conventional. To this end a screw conveyor 36 extends transversely in a trough 37 from the inside of the belt loop 23c. The side walls of the trough diverge and are raised above the screw 36 within the loop 23c in a hopper effect bringing the side wall 37a of the trough to the belt 23 in the region of the sprocket 28 and elevating the other side wall 37b thereof above the level of the lower course 23b of the belt.

Complementing the screw conveyor 36 is a product feeder located in the front compartment 26 and extending transversely of the belt 23 for delivering to the lower course 23b the comestible products to be frozen. This feeder may take the form of a belt conveyor 38 discharging onto a shaker pan 40 which traverses the lower course 23b and feeds thereto along a diagonal edge 40a to evenly spread the product on the belt. The pan 40 is vibrated or gently shaken endwise about a pivot 41 as by a motor driven eccentric 42.

The belt 23 may take the form of woven wire secured along its longitudinal side edges to chains 43. To prevent belt sagging within the freezing tunnel there is provided along one side thereof a belt stand 44 having upper and lower cross-braces 44a–44b extending between pairs of legs 44c at the level of the freezing belt courses 23a–23b and these may be supplemented by diagonal braces. Upper and lower enclosed guideways 45–46 for the chains 43 are supported by the stand 44 and they each have sealing strips 47–48 which wipe the belt inwardly of the chains. The sides of the belt stand are enclosed by side plates or panels defining a longitudinal plenum 50 beneath the lower course 23b, and a longitudinal freezing zone 51 between the two belt courses. Baffles 52—52 are also placed in the tunnel openings 21–22 to close the ends of this freezing zone 51 other than for passage of the freezing belt and comestible product. To provide access to the freezing zone for cleaning, some of the side pannels 53 facing the center of the freezing tunnel are made readily removable, and similarly certain of the panels 54 at the bottom of the plenum 50 are access panels.

Opposite the belt stand 44 there is provided an elongated stand 55 for supporting a bank of refrigerated freezing coils 56 arranged for circulation of air downwardly therethrough. If finned coils are used it is preferred that the pitch of the fins on the top pipes be greater than those on the bottom since the top pipes will collect most of the condensation. A water spray manifold 57 is provided above the coil bank 56 for defrosting thereof. In this regard, the coil stand 55 rests on a drain pan 58 to collect the defrosting water and residue.

A line of motor driven propeller fans 60 is mounted on the belt stand 44 above the floor of the freezing tunnel for blowing air upwardly through the belt 23. Each fan is provided with a set of turning baffles 61 in the plenum 50 to direct the air upwardly. The suction side of the fans is located in a plenum 62 which is closed from a top chamber 64 by panels 63 between the stands 44, 55 and communicates with the bank of freezing coils 56. With this arrangement the fans cause the air within the freezing tunnel to circulate in closed loops, and namely, from each fan through the turning baffles 61, up through both courses of the conveyor belt 23, across the top chamber 64 into the coil bank 56, and down through the latter into the plenum 62 to the suction side of the fan for recirculation.

It will be noted that vertical and horizontal transverse baffles 66–67 are provided at the ends of the tunnel beneath the lower run 23b of the belt. These baffles isolate the product on the ingress and egress portions of the belt from action of the fans 60 and cause relatively dead air spaces adjacent the tunnel openings 21–22.

For defrosting and cleaning of the belt 23 a spray washer 63 and blower 64 are mounted in the loading compartment 26 above the return course 23a. These are complemented by a collection pan 65 which is located beneath the return course 23a above the spreader 40. This pan is suitably baffled and provision is made for flushing and draining thereof.

In the operation of the freezing tunnel the comestible product to be frozen is continuously delivered in the chamber 26 to the lower course 23b of the freezing belt by the conveyor 38 and spreader 40. The comestible then enters the freezing tunnel 20 through the opening 21, passes through a dead air space, and is then subjected to the refrigerated air blast from the fans 60 passing upwardly therethrough. The location and spacing of the vanes 61 and speed of the fans is adjusted to cause agitation of the particular product being frozen by the updraft to keep it from freezing to the belt 23 and to prevent individual pieces of the product from freezing to one another. During this freezing operation the upper return course 23a of the belt serves the important function of isolating the product in the zone 51 so that particles of the product will not be drawn up into the upper chamber 64 and down into the freezing coils 56 with the circulating air. Moisture from the product collectors on the refrigerated coils 56 and hence the blades of the fans 60 remain substantially free of ice. The amount of updraft can be varied along the length of the freezing tunnel as by using variable speed motors on the fans 60, there normally being less agitation requirement after the surface moisture on the comestibles has frozen. After the frozen product passes through the tunnel exit 22 into the chamber 27 it drops from the lower belt course 23b at the sprocket 28 and is guided by the hopper wall 37a into the screw conveyor 36 which conducts it to the desired packaging point. The empty belt after the passing down through the elbow portion 23c of its travel and back through the freezing tunnel for performing its product confining function, is subjected to warm water spray from the washer 63 in the chamber 26 to remove any ice that has formed thereon. The belt 23 is then subjected to a down blast of heated air from the blower 64 to dry the belt and to blow off any particles of the comestible which have stuck to the belt during agitation thereof by the updraft of refrigerated air in the freezing tunnel. These comestible particles are collected in the pan 65 together with water and ice particles resulting from the belt defrosting and drying stages.

During defrosting of the refrigerated coils 56 by spraying water from the manifold 57, the various tunnel chambers, and particularly the freezing zone 51, can be readily cleaned by removing the related access panels. This cleaning operation is greatly simplified because of the confining action of the upper return course 23a of the freezing belt in preventing the comestible from being carried into the upper chamber 64, the freezing coils 56, the lower chamber 62, or the fans 60.

The invention should be clearly understood from the foregoing detailed description of my now-preferred illustrated embodiment. Changes in the details of construction can be resorted to without departing from the spirit of the invention and it is accordingly my intention that no limitations be implied and that the hereto annexed claims be given the broadest interpretation to which the employed language fairly admits.

What I claim is:

1. In a continuous freezer for a comestible product, an endless perforated-belt conveyor having an upper return course overlying a lower product-carrying course which discharges into the mouth of an open downwardly extending loop formed in the conveyor between the discharge end of the product-carrying course and the beginning of said return course, and means for passing a gaseous cooling medium upwardly through both said courses of the conveyor intermediate their ends.

2. In a continuous freezer for a comestible product, an endless perforated-belt conveyor having an upper return course overlying a lower product-carrying course which discharges into the mouth of an open downwardly extending loop formed in the conveyor between the discharge end of the product-carrying course and the beginning of said return course, means for enclosing an intermediate part of the length of the space located between said conveyor courses to define a freezing zone, and means for passing a gaseous cooling medium upwardly through said freezing zone by passage thereof upwardly through both said courses.

3. In a continuous freezer for a comestible product, an endless perforated-belt conveyor having an upper return course overlying a lower product-carrying course which discharges into the mouth of an open downwardly extending loop formed in the conveyor between the discharge end of the product-carrying course and the beginning of said return course, product-from-conveyor transport means extending transversely of said conveyor from within said loop for receiving product discharging from said product-carrying course, and means for passing a gaseous cooling medium upwardly through both said courses of the conveyor.

4. In a continuous freezer for a comestible product, an endless perforated-belt conveyor having an upper return course overlying a lower product-carrying course which discharges into the mouth of an open downwardly extending loop formed in the conveyor between the discharge end of the product-carrying course and the beginning of said return course, product-to-conveyor transport means extending transversely of said conveyor between said courses near the beginning of said product-carrying course, product-from-conveyor transport means extending transversely of said conveyor from within said loop for receiving product discharging from said product-carrying course, and means for passing a gaseous cooling medium upwardly through both said courses of the conveyor between said product-to-conveyor transport means and said loop.

5. In a continuous freezer for a comestible product, an endless perforated-belt conveyor having an upper return course overlying a lower product-carrying course which discharges into the mouth of an open downwardly extending loop formed in the conveyor between the discharge end of the product-carrying course and the beginning of said return course, means for enclosing an intermediate part of the length of the space located between said conveyor courses to define a freezing zone, means for passing a gaseous cooling medium upwardly through said freezing zone by passage thereof upwardly through both said courses, product-to-conveyor transport means between said freezing zone and the beginning of said product-carrying course and extending transversely of said conveyor between said courses, and product-from-conveyor transport means extending transversely of said conveyor from within said loop for receiving frozen product discharging from said product-carrying course.

6. In a continuous freezer for a comestible product, an endless perforated-belt conveyor having an upper return course overlying a lower product-carrying course, means for enclosing an intermediate part of the length of the space located between said conveyor course to define a freezing zone, means for passing a gaseous cooling medium upwardly through said freezing zone by passage thereof upwardly through both said courses, and means remote from said freezing zone for transporting product to and from said product-carrying course.

7. In a continuous freezer for a comestible product, an endless perforated-belt conveyor having an upper return course overlying a lower product-carrying course, means for passing a gaseous cooling medium upwardly through both said courses of the conveyor in a freezing zone located intermediate their ends, collection means located between said courses and between said freezing zone and the end of said return course, spray means above said return course and directed toward said collection means for spraying defrosting solution through said conveyor as it returns from said freezing zone, air circulating means above said return course and directed toward said collection means between said spray means and the end of said return course for drying said conveyor after it is defrosted and for blowing off any particles of said product which have adhered thereto, and means remote from said freezing zone for transporting product to and from said product-carrying course.

8. In a continuous freezer for a comestible product, an endless perforated-belt conveyor having an upper return course overlying a lower product-carrying course which discharges into the mouth of an open downwardly extending loop formed in the conveyor between the discharge end of the product-carrying course and the beginning of said return course, means for passing a gaseous cooling medium upwardly through both said courses in a freezing zone located intermediate their ends, product-to-conveyor transport means extending transversely of said conveyor and located between said freezing zone and the beginning of said product-carrying course, product-from-conveyor transport means extending transversely of said conveyor from within said loop for receiving frozen product discharging from said product-carrying course, collection means between said return course and said product-to-conveyor transport means, and conveyor defrosting and cleaning means above said return course and directing defrosting and cleaning media downwardly toward said collection means.

9. In a continuous freezer for a comestible product, an endless perforated-belt conveyor having an upper return course overlying a lower product-carrying course which discharges into the mouth of an open downwardly extending loop formed in the conveyor between the discharge end of the product-carrying course and the beginning of said return course, means for enclosing an intermediate part of the length of said courses and defining a freezing chamber for vertically enclosing the space between the side edges of said courses whereby product passing through said freezing chamber on said product-carrying course is confined between said courses, air refrigerating means in said freezing chamber, air circulating means between said air refrigerating means and said product-carrying course for blowing chilled air upwardly through both said courses and the product carried therebetween and recirculating said air through said air refrigerating means, product-to-conveyor transport means extending transversely of said conveyor and located between said freezing chamber and the beginning of said product-carrying course, and product-from-conveyor transport means extending transversely of said conveyor from within said loop for receiving frozen product discharging from said product-carrying course.

10. In a continuous freezer for a comestible product, an endless perforated-belt conveyor having an upper return course overlying a lower product-carrying course, means for enclosing an intermediate part of the length of said courses and defining a freezing chamber, means in said freezing chamber for vertically enclosing the space between the side edges of said courses whereby product passing through said freezing chamber on said product-carrying course is confined between said courses, air refrigerating means beside said conveyor and in communication with said return course in said freezing chamber, air circulating means communicating with and located below said air refrigerating means in said chamber, baffle means beneath said conveyor for directing refrigerated air from said air circulating means upwardly through said courses to thereby freeze and agitate the product while being carried through said freezing chamber on said product-carrying course, and means for transporting product to and from said product-carrying course externally of said freezing chamber at opposite ends thereof.

11. In a continuous freezer for a comestible product, an endless perforated-belt conveyor having an upper return course overlying a lower product-carrying course, means including removable vertical side plates for enclosing the sides of an intermediate part of the length of the space located between said courses, means for passing a gaseous cooling medium upwardly through said courses for freezing and agitating product carried on said product-carrying course, and means out of communication with said cooling medium for transporting product to and from said product-carrying course at the ends thereof.

12. In a continuous freezer for a comestible product, an endless perforated-belt conveyor having an upper return course overlying a lower product-carrying course, air refrigerating means beside said conveyor, means for circulating air in a closed loop upwardly through both said courses and downwardly through said air refrigerating means, and means remote from said circulating air for transporting product to and from said product-carrying course.

13. In a continuous freezer for a comestible product, an endless perforated-belt conveyor having an upper return course overlying a lower product-carrying course which discharges into the mouth of an open downwardly extending loop formed in the conveyor between the discharge end of the product-carrying course and the beginning of said return course, air refrigerating means beside said conveyor, means for circulating air in a closed loop upwardly through both said courses and downwardly through said air refrigerating means, product-to-conveyor transport means remote to said circulating air and extending transversely of said conveyor between said courses near the beginning of said product-carrying course, and product-from-conveyor transport means extending transversely of said conveyor from within said open loop thereof for receiving frozen product discharging from said product-carrying course.

References Cited in the file of this patent

UNITED STATES PATENTS

| 2,237,256 | Finnegan | Apr. 1, 1941 |
| 2,402,921 | Sharpe | June 25, 1946 |
| 2,632,312 | Polk | Mar. 24, 1953 |

FOREIGN PATENTS

| 550,818 | Great Britain | Jan. 26, 1943 |
| 666,505 | France | May 27, 1929 |